(12) United States Patent
Mueller

(10) Patent No.: US 9,103,370 B2
(45) Date of Patent: Aug. 11, 2015

(54) DRIVING DEVICE HAVING AN ACTIVELY SUPPORTED DRIVE SHAFT

(75) Inventor: Joachim Mueller, Werneck (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/004,108

(22) PCT Filed: Mar. 12, 2012

(86) PCT No.: PCT/EP2012/054252
§ 371 (c)(1),
(2), (4) Date: Nov. 14, 2013

(87) PCT Pub. No.: WO2012/120149
PCT Pub. Date: Sep. 13, 2012

(65) Prior Publication Data
US 2014/0105524 A1    Apr. 17, 2014

(30) Foreign Application Priority Data

Mar. 10, 2011  (DE) .......................... 10 2011 005 360

(51) Int. Cl.
*F16C 25/00*    (2006.01)
*F16C 27/08*    (2006.01)
(Continued)

(52) U.S. Cl.
CPC ................. *F16C 25/00* (2013.01); *F16C 39/02* (2013.01); *H02K 7/081* (2013.01); *F16C 29/001* (2013.01)

(58) Field of Classification Search
CPC .......... F16C 25/00; F16C 33/06; F16C 23/02; F16C 29/001; H02K 7/081; F16H 1/16; F16H 55/22

USPC ............... 384/7, 91, 129, 252, 295, 448, 217, 384/218; 74/89.14, 425
See application file for complete search history.

(56) References Cited

U.S. PATENT DOCUMENTS 2,905,289 A * 9/1959 Lee et al. .......................... 477/23
RE26,356 E * 3/1968 Pickles ............................ 74/411
(Continued)

FOREIGN PATENT DOCUMENTS

CN  101552525 A  10/2009
DE  2 312 395 A1  9/1973
(Continued)

OTHER PUBLICATIONS

International Search Report, dated Aug. 6, 2013 for Corresponding International Application No. PCT/EP 2012/054252, 5 pages.
(Continued)

*Primary Examiner* — Marcus Charles
(74) *Attorney, Agent, or Firm* — Christie, Parker & Hale, LLP

(57) ABSTRACT

A driving device for an adjusting device of a motor vehicle is provided. The driving device comprises a housing or housing section which at least partially encloses components of the driving device and an electric-motor-driven drive shaft which extends in a longitudinal direction and which is axially supported on the housing or housing section at least via one end. An active bearing element is arranged between the housing or housing section and the drive shaft at at least one end of the drive shaft, said bearing element being suitable for acting on the drive shaft axially in the longitudinal direction during the operation of the driving device.

31 Claims, 11 Drawing Sheets

(51) Int. Cl.
*F16C 39/02* (2006.01)
*H02K 7/08* (2006.01)
*F16C 29/00* (2006.01)

(56) References Cited

U.S. PATENT DOCUMENTS

| | | | |
|---|---|---|---|
| 3,455,174 A * | 7/1969 | Pickles | 74/89.14 |
| 4,652,781 A | 3/1987 | Andrei-Alexandru et al. | |
| 4,727,274 A * | 2/1988 | Adam et al. | 310/239 |
| 4,742,726 A * | 5/1988 | Adam et al. | 74/425 |
| 4,885,948 A * | 12/1989 | Thrasher et al. | 74/89.14 |
| 4,890,027 A | 12/1989 | Bohner et al. | |
| 5,216,929 A * | 6/1993 | Ochiai et al. | 74/425 |
| 5,719,723 A | 2/1998 | Kim | |
| 6,003,193 A * | 12/1999 | Rivin et al. | 15/250.3 |
| 6,215,209 B1 | 4/2001 | Yamamoto | |
| 6,481,306 B2 * | 11/2002 | Adachi et al. | 74/425 |
| 6,505,968 B1 | 1/2003 | Fleury et al. | |
| 6,520,678 B2 | 2/2003 | Aiken et al. | |
| 6,920,794 B2 | 7/2005 | Luo et al. | |
| 8,042,422 B2 * | 10/2011 | Meyer | 74/421 A |
| 8,072,119 B2 | 12/2011 | Engel | |
| 2005/0017600 A1 | 1/2005 | Nomerange | |

FOREIGN PATENT DOCUMENTS

| | | | | |
|---|---|---|---|---|
| DE | 689 20 829 T2 | 5/1990 | | |
| DE | 42 10 302 A1 | 9/1993 | | |
| DE | 4324912 A1 * | 1/1995 | | H02K 5/24 |
| DE | 19714237 C1 * | 1/1998 | | F16C 27/08 |
| DE | 197 27 119 C1 | 7/1998 | | |
| DE | 600 19 232 T2 | 3/2006 | | |
| DE | 10 2007 003 280 A1 | 7/2008 | | |
| DE | 10 2008 030 738 A1 | 12/2009 | | |
| EP | 0 563 410 A1 | 10/1993 | | |
| EP | 1 436 880 B1 | 7/2004 | | |
| EP | 1 521 000 A1 | 4/2005 | | |
| GB | 1 592 748 A | 7/1981 | | |
| JP | 62-149642 U | 9/1987 | | |
| JP | 04069404 A | 3/1992 | | |
| JP | 07-057228 A | 3/1995 | | |
| JP | 08-235545 A | 9/1996 | | |
| JP | 10051998 A | 2/1998 | | |
| JP | 2004-60746 A | 2/2004 | | |
| JP | 2009-250260 A | 10/2009 | | |
| JP | 2009-264544 A | 11/2009 | | |
| KR | 100837465 B1 * | 8/2008 | | B60J 5/04 |

OTHER PUBLICATIONS

Dissertation for receiving the academic degree by Dipl. Ing. Mohamed Abed al Wahab (front page and abstract—including English abstract), Oct. 22, 2004, 6 sheets.
Korean Office action dated Mar. 25, 2015 for Application No. KR 10-2013-7026627, 6 pages, and English translation, 6 pages.
Japanese Office action for Application No. 2013-557134, dated May 12, 2015 (3 pages) and English translation (3 pages).
Chinese Office action dated May 29, 2015 for Application No. 201280012692.0 and English translation (15 pages).

* cited by examiner

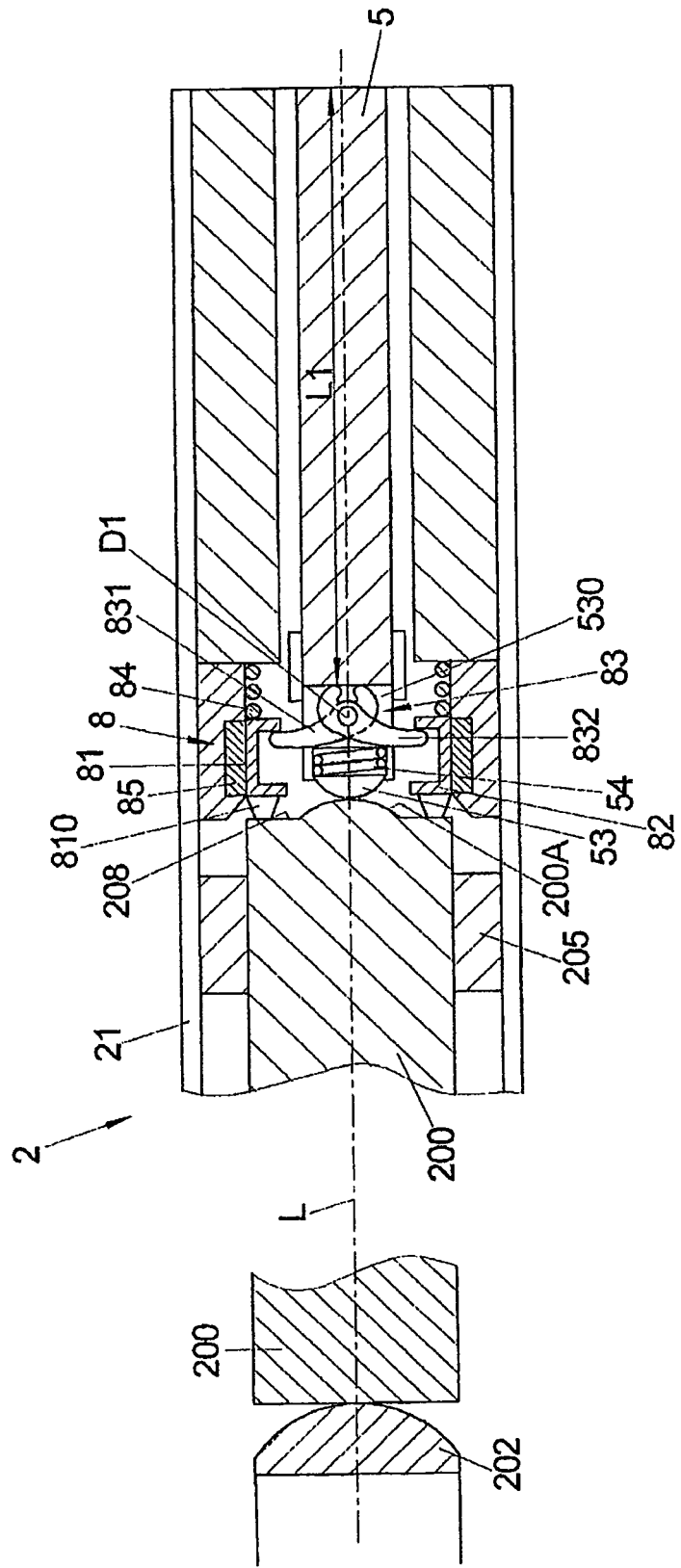

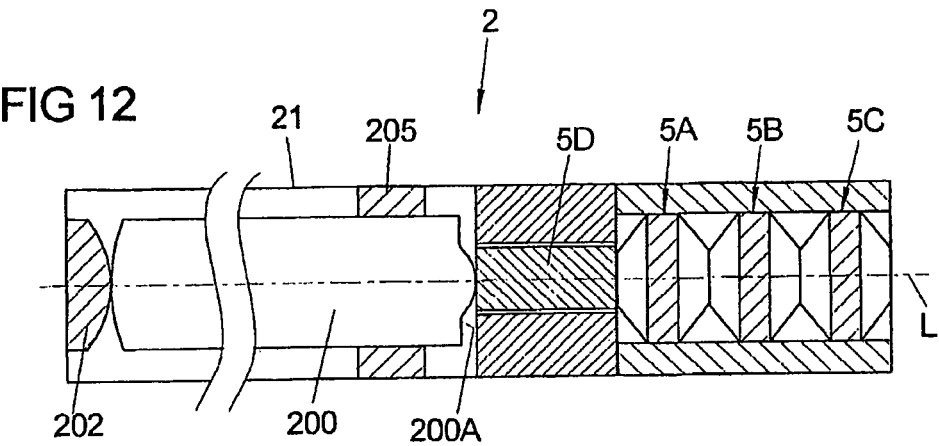
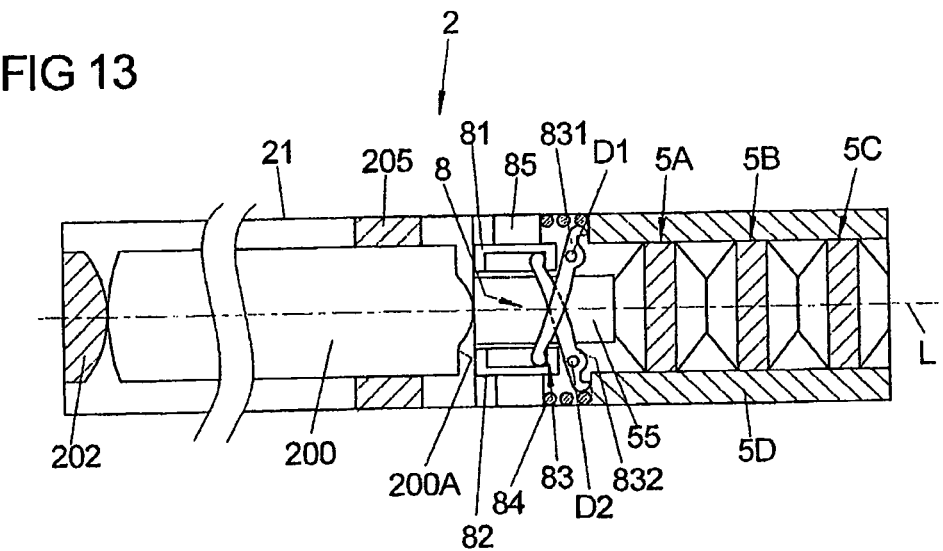

DRIVING DEVICE HAVING AN ACTIVELY SUPPORTED DRIVE SHAFT

CROSS-REFERENCE TO A RELATED APPLICATION

This application is a National Phase Patent Application of International Patent Application Number PCT/EP2012/054252, filed on Mar. 12, 2012, which claims priority of German Patent Application Number 10 2011 005 360.3, filed on Mar. 10, 2011.

BACKGROUND

The invention relates to a driving device for an adjusting device of a motor vehicle and to a method for operating a driving device of this kind.

A driving device of this kind for an adjusting device of a motor vehicle comprises a housing or housing section which at least partially encloses components of the driving device and an electric-motor-driven drive shaft which extends in a longitudinal direction and which is axially supported on the housing or housing section at least via one end. In the context of an adjusting device, such a driving device can be used, for example, in the form of a window lifter on a vehicle door or, alternatively, in the form of a seat adjusting system or of a sliding roof actuation system, for example.

In the case of a driving device of this kind, which is known from EP 1 436 880 B1 and which is configured as a drive for a window lifter, a drive shaft is supported axially on a housing of the driving device. Here, support can be provided, for example, by the fact that the drive shaft rests axially against the housing or against a housing section or runs on the housing via a thrust element, e.g. a disk-shaped thrust element, for providing low friction support.

The drive shaft in the case of a conventional driving device has an axial play relative to the housing providing axial support for the drive shaft and, as a rule, this cannot be completely avoided and changes during the operation of the driving device owing to wear. Owing to such axial play, there may be troublesome noise during the operation of the driving device, e.g. when switching the direction of rotation of the driving device and consequently when there is a change in the axial loading direction of the drive shaft (referred to as the "changeover click"). Moreover, the change in the axial play due to wear during operation can also have a disadvantageous effect on the operating behavior of the driving device and can lead to unstable running of the driving device.

In the case of the driving device known from EP 1 436 880 B1, a piezoelectric actuator reaches radially around the drive shaft, said actuator exercising a braking action on the drive shaft of the driving device when, for example, a trapped part is detected at a window pane that is to be adjusted by the window lifter. Axial support is not provided by the actuator described in EP 1 436 880 B1.

GB 1 592 748 B has disclosed a piezoelectric sensor which is arranged at one axial end of a drive shaft and which senses and evaluates axial forces arising at the drive shaft in order to detect trapping at an adjusting device. The drive shaft is supported directly on a housing of the driving device, on the one hand, and via a spring acting on the piezoelectric sensor, on the other hand.

SUMMARY

It is the underlying object of the present invention to make available a driving device and a method for operating a driving device of this kind by means of which it is possible to achieve advantageous axial support of a drive shaft.

According to an exemplary embodiment of the invention, it is envisaged, in a driving device of the type stated at the outset, that an active bearing element be arranged between the housing or housing section and the drive shaft at at least one end of the drive shaft, said bearing element being suitable for acting on the drive shaft axially in the longitudinal direction during the operation of the driving device.

In particular, the active bearing element can be designed to bring about locking of a rotary motion of the drive shaft in accordance with an actuation. This stems from the idea of providing an active bearing element which is designed to bring about locking of the motion of the drive shaft. It is thus possible for the drive shaft to be selectively locked or released in accordance with an actuation of the active bearing element, with the result that the drive shaft is selectively fixed or subjected to only a small force for ease of rotation.

Providing an active bearing element of this kind, which can bring about locking of the rotary motion of the drive shaft in accordance with its actuation, enables the driving device overall to be of non-self-locking design and, at the same time, makes it possible to dispense with passive braking devices, such as wrap spring brakes or the like, which are conventionally provided in order to block a force applied on the output side and thus prevent return of an adjustable part owing, for example, to the action of a force due to weight. A conventionally provided self-locking system for the driving device or a conventionally provided passive braking device usually leads to the occurrence of frictional losses and thus to the driving device overall becoming stiff and efficiency decreasing. In the case of a wrap spring brake, which is conventionally provided as a braking device, a wrap spring must perform an accompanying rubbing movement during normal operation of a driving device, for example, resulting in friction which is not negligible and consequently in an increased expenditure of force. By virtue of the fact that, according to the claim, an active bearing element is provided which selectively brings about locking of a rotary motion of the drive shaft or does not do so depending on its actuation position, frictional losses can be reduced in normal operation, during which the drive shaft is supposed to run without inhibition. When the driving device is stationary or, for example, also in the case of trapping, locking of the drive shaft can then be brought about by means of the active bearing element, ensuring that the drive shaft is fixed and, in this way, is prevented from performing a rotary motion.

The active bearing element can be designed as a piezoelectric actuator, as an electromagnetic actuator or as a magnetostrictive actuator, for example. The active bearing element can be actively actuated by applying an electric, electromagnetic or magnetic signal and thus has an active effect on the axial play of the drive shaft relative to the housing. The axial play is thus not predetermined statically by passive elements when the driving device is assembled but can be influenced and controlled actively by appropriate control of the bearing element.

In this case, the active bearing element can preferably be actuated in order to set an axial play of the drive shaft relative to the housing or housing section and/or in order to influence the vibrational behavior of the drive shaft and is designed to act axially in the longitudinal direction on the drive shaft.

By virtue of the fact that the active bearing element is also additionally used to set an axial play, the active bearing element performs a dual function. On the one hand, the active bearing element can bring about locking of the rotary motion of the drive shaft in accordance with its actuation position. On the other hand, the active bearing element can act in such a way on the drive shaft when the actuating element is not bringing about locking of the rotary motion of the drive shaft that the axial play of the drive shaft is advantageously set in an active manner.

In this way, it is possible, for example, to make provision to bring about locking of the rotary motion of the drive shaft directly or indirectly by means of the active bearing element in a first operating state, e.g. when the driving device is stationary or in the case of trapping, and in this way to fix the drive shaft. In a second operating state, in contrast, in which an adjustable part is being adjusted by means of the driving device, the active bearing element can act on the drive shaft in such a way that the axial play of the drive shaft is advantageously set in an active manner, it being possible for the axial play to be set statically or dynamically in accordance with a load on the drive shaft.

By means of such active support for the drive shaft in the axial direction at at least one end, it is possible to avoid troublesome noise during operation, e.g. when switching over the direction of rotation of the driving device, by specifying, e.g. minimizing, the axial play of the drive shaft during operation in a suitable manner, thereby ensuring that a change in the loading of the drive shaft cannot lead to axial displacement.

Moreover, it is possible, by means of the active support, for the operating behavior of the driving device to be controlled in accordance with certain operating states, for example. Thus, the axial play of the drive shaft can be increased, in the case of cold starting of the driving device for example, in order to optimize cold startup and in order then to reduce or variably specify the play in a suitable manner during subsequent operation of the driving device.

Moreover, it is also possible, where appropriate, to compensate for motor unbalance through dynamic setting of the axial play of the drive shaft by responding dynamically, by dynamic variation of the axial play of the drive shaft, to unbalances and, where appropriate, thereby to vibrations excited at the drive shaft.

In this context, a dynamic increase in the excitation of a motor (armature) unbalance can normally arise, in systems in which the axial play is not actively compensated, from the fact that, starting from virtual axial freedom from play of the armature shaft, manufacturing tolerances or wear results in loose axial support at at least one axial end of the armature shaft (depending on the startup direction of the motor). Owing to a twisting effect of the rotating motor armature, there can then be an increase in motor excitation.

It is advantageous if, when viewed in the longitudinal direction, the active bearing element can be arranged axially between the housing or housing section and the associated end of the drive shaft. In principle, it is sufficient to provide an active bearing element at one axial end of the drive shaft. However, it is also possible and conceivable, where appropriate, to provide an active bearing element at each of the axial ends of the drive shaft, said bearing element being arranged between the associated axial end of the drive shaft and a housing section serving for axial support.

In accordance with an actuation, the active bearing element brings about locking of a rotary motion of the drive shaft. For this purpose, the bearing element can, for example, exercise a braking action on the drive shaft in accordance with the axial play set by the active bearing element. This can serve, for example, to brake a rotary motion of the drive shaft when trapping is detected and hence to prevent further adjustment of an adjustable part to be adjusted. It is likewise possible by means of the locking to fix the driving device when stationary, thus ensuring that an adjustable part to be adjusted does not move owing to externally acting forces or its own weight when the driving device is stationary.

To lock the rotary motion of the drive shaft in accordance with certain operating states, a braking device which interacts with the active bearing element and is designed to lock a rotary motion of the drive shaft by means of a braking action involving interaction with the active bearing element can be provided. For this purpose, the braking device can be coupled to the active bearing element by a lever mechanism designed as a step up mechanism and can have at least one brake shoe for braking the drive shaft. One or more brake shoes can, for example, be preloaded relative to the housing or housing section of the driving device in the direction of a position in which the at least one brake shoe rests with a braking action on the drive shaft or on a brake disk arranged on the drive shaft.

In this case, the active bearing element can, for example, be coupled to the at least one brake shoe in order to release the at least one brake shoe from the braking position, thus ensuring that the brake shoe is released from its braking engagement with the drive shaft when the active bearing element is actuated. In this case, it is furthermore possible to set the axial play during the operation of the driving device in the desired manner by means of the active bearing element. The active bearing element thus does not interact in a self-locking manner with the drive shaft but serves for indirect control of the braking device in order to establish or release the braking effect, wherein the brake shoes are moved automatically into their braking position in the case of non-energization owing to appropriate preloading and are only released from this braking position when the active bearing element is energized.

The active bearing element can be axially in contact with the associated end of the drive shaft via a thrust element, for example, to allow setting of the axial play of the drive shaft. The thrust element can, for example, be arranged on the active bearing element and be connected to the bearing element, wherein, in particular, it is conceivable and possible for the thrust element to be preloaded axially by a spring relative to the active bearing element so as to rest against the associated end of the drive shaft. In the latter case, the axial play is not set exclusively by means of the active bearing element but in a process of interaction between the active bearing element and the spring preloading the thrust element. Thus, the axial play is, on the one hand, set actively by means of the active bearing element and, on the other hand, by means of the spring characteristic of the preloading spring.

The active bearing element can, for example, be configured as a piezoelectric actuator, as an electromagnetic actuator or, alternatively, as a magnetostrictive actuator, although this is to be understood merely by way of example and other possibilities for the configuration of the active bearing element are also conceivable. If the active bearing element is constructed as a piezoelectric actuator, the active bearing element can advantageously be of multilayer construction with a plurality of piezoelectric layers. This makes it possible for one of the piezoelectric layers to embody a sensor section for detecting axial forces acting on the active bearing element via the drive shaft, thus making it possible to use the active bearing element in the context of a feedback control circuit, on the one hand to detect axial forces exerted by the drive shaft and on the other hand to set the axial play in accordance with the effective forces in order to exercise closed-loop and open-loop control of the operating behavior. The multilayer construction of the active bearing element with a plurality of piezoelectric layers furthermore makes it possible to obtain a piezoelectric actuator which can be deformed mechanically over a relatively large distance in order to set the axial play. This is achieved by means of the multilayer design of the active bearing element, in which the layers are as it were arranged in series, with the result that, given appropriate energization, the deformation resulting at the layers accumulates and allows a relatively large deformation.

An active bearing element constructed as a piezoelectric actuator, for example, can serve as a sensor for detecting vibrations and as an actuator for producing the compensation signal, wherein the active bearing element can be operated simultaneously or alternately as a sensor for detecting vibrations and as an actuator for producing the compensation signal. A single piezoelectric element can thus be used both as a sensor and as an actuator. If the active bearing element serves alternately as a sensor and an actuator (i.e. if sensor operation and actuator operation are staggered in time), the time for sensor operation is preferably shorter than for actuator operation.

It is advantageous if the active bearing element is connected to control electronics, by means of which the axial play is set and controlled.

On the one hand, it is possible here to set and specify the axial play in a quasi-static manner during the operation of the driving device by setting the axial play and modifying it in a situation-dependent manner, e.g. when the driving device is switched off or when trapping is detected.

On the other hand, however, it is also possible to change and to specify the axial play in a dynamic manner by means of the control electronics by using the active bearing element to produce a dynamic compensation signal for this purpose in accordance with vibrations detected at the drive shaft. This makes it possible to dynamically compensate a motor unbalance, for example, by compensating or at least modifying vibrations and oscillations arising at the drive shaft by active control of the active bearing element.

In this second case, the control electronics can be designed to produce the compensation signal for eliminating the vibrations detected or for adjusting the vibrations to a predetermined target function, i.e. in accordance with vibrations excited at the drive shaft to generate a compensation signal matched in amplitude and phase to compensate the excited vibrations.

The object is also achieved by a method for operating a driving device for an adjusting device of a motor vehicle. Here, the driving device has a housing or housing section which at least partially encloses components of the driving device and an electric-motor-driven drive shaft which extends in a longitudinal direction and which is axially supported on the housing or housing section at least via one end. Provision is made here for an active bearing element to be arranged between the housing or housing section and the drive shaft at at least one end of the drive shaft, said bearing element being actuated during the operation of the driving device in order to act on the drive shaft axially in the longitudinal direction.

In a first operating state of the driving device, the active bearing element preferably brings about locking of a rotary motion of the drive shaft and, in a second operating state of the driving device, is actuated in order to set an axial play of the drive shaft relative to the housing or housing section and/or in order to influence the vibrational behavior of the drive shaft and, for this purpose, acts axially in the longitudinal direction on the drive shaft.

The advantages described above for the driving device and the advantageous embodiments can also be applied analogously to the method.

In particular, the active bearing element can be used to set the axial play in accordance with an operating state of the driving device, e.g. in accordance with the operating temperature of the driving device. It is likewise possible to use the active bearing element to brake the drive shaft (in particular in order to prevent inertia-related continued running) if trapping is detected at a component driven by the driving device. For this purpose, it is conceivable, in a manner analogous to that described above, for the active bearing element to have a direct braking action on the drive shaft or to serve indirectly to control a braking device.

It is likewise possible, in accordance with vibrations excited at the drive shaft during the operation of the driving device, for the active bearing element to produce a compensation signal which counteracts the vibrations of the drive shaft. It is thereby possible substantially to eliminate the vibrations excited at the drive shaft, e.g. in a predetermined frequency range, or the excited vibrations can be modified in such a way that a certain target function of said vibrations is obtained, leading to only a little noise evolution and an advantageous operating behavior of the driving device. The frequency range in which the operating behavior can be influenced dynamically in this manner can be between 20 Hz and 500 Hz, in particular between 20 Hz and 150 Hz, for example.

BRIEF DESCRIPTION OF THE DRAWINGS

The concept underlying the invention will be explained in greater detail below by means of the illustrative embodiments shown in the figures.

FIG. 9A shows a schematic view of another illustrative embodiment of a driving device having an actively supported drive shaft, in an unenergized state of an active bearing element.

FIG. 12 shows a schematic view of another illustrative embodiment of an actively supported drive shaft.

FIG. 13 shows a schematic view of yet another illustrative embodiment of an actively supported drive shaft.

DETAILED DESCRIPTION

Figure 1:
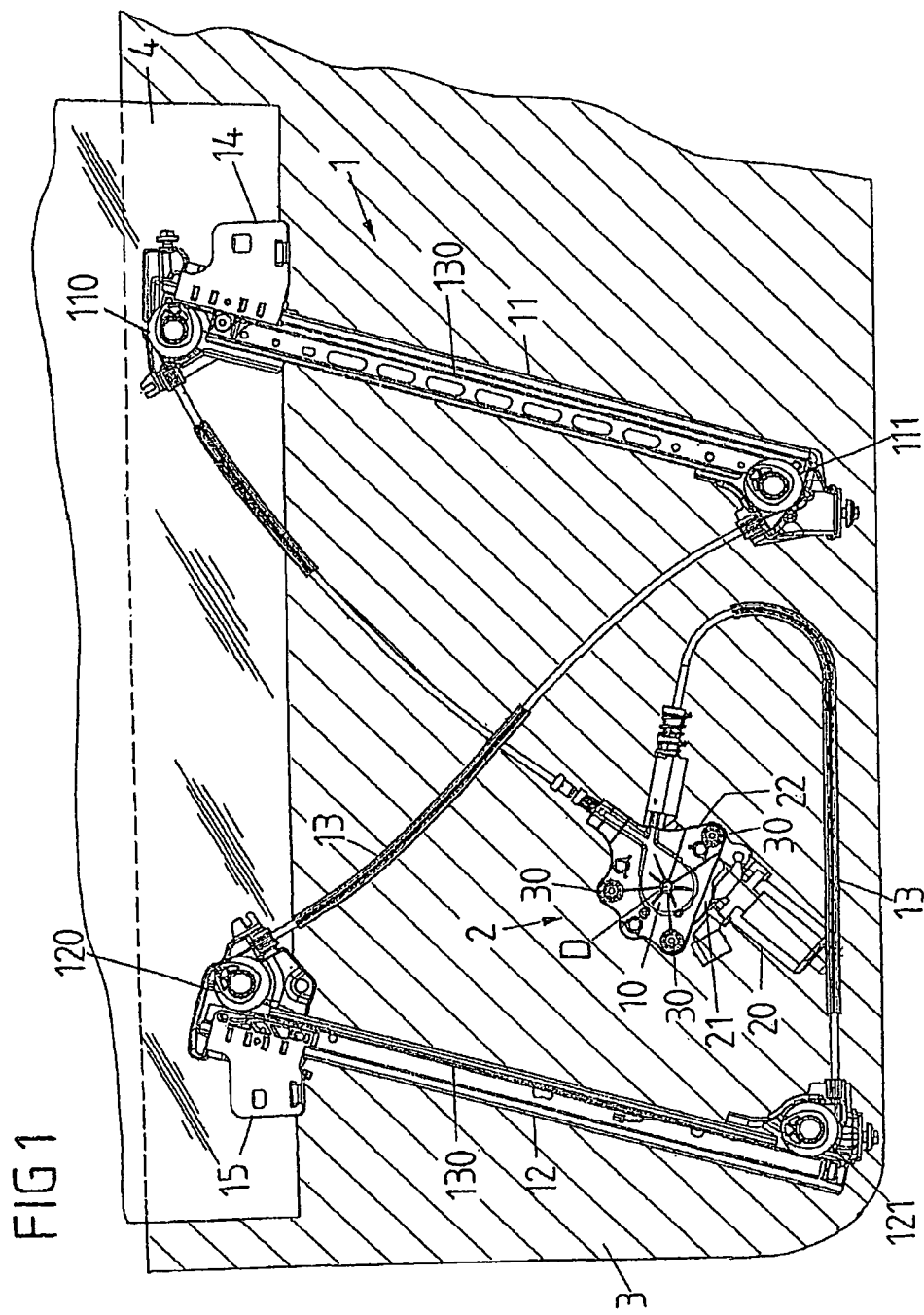
FIG. 1 shows an overview of an adjusting device in the form of a window lifter having a driving device.

FIG. 1 shows an adjusting device 1 in the form of a dual-strand cable-type window lifter, which is used to adjust a window pane 4 on a vehicle door. The adjusting device 1 in the form of the window lifter is arranged on an assembly carrier 3, which can be secured on a vehicle door in a modular manner together with the adjusting device 1 arranged thereon in order to provide a door module and, in particular, can be configured to separate a wet space N of the vehicle door from a dry space T in a moisture-tight manner when secured on the vehicle door.

The adjusting device 1 in the form of the window lifter has a driving device 2 and two guide rails 11, 12 extending in parallel. The driving device 2 is connected via a traction means 130 in the form of a flexible traction cable guided at least over a certain section in a Bowden sheath 13 to driver elements 14, 15, which are guided on the guide rails 11, 12 and via which the window pane 4 is slidably supported on the guide rails 11, 12. The traction means 130 extends from a cable drum 10 of the driving device 2 toward an upper deflecting element 110 of one guide rail 11, from said upper deflecting element 110 along guide rail 11 toward a lower deflecting element 111, diagonally from said lower deflecting element 111 to an upper deflecting element 120 of the other guide rail 12, along the other guide rail 12 toward a lower deflecting element 121 and, from there, back to the cable drum 10. In this way, the traction means 130 forms a closed cable loop which can be actuated in its position by a rotary motion of the cable drum 10 in order to adjust the driver elements 14, 15 along the guide rails 11, 12.

The driving device 2 has an electric motor 20, a housing 21 enclosing a transmission, and a bearing cover 22 enclosing the cable drum 10. The driving device 2 is connected to the assembly carrier 3 by connection points 30 and is thus held on the assembly carrier 3.

Figure 2:
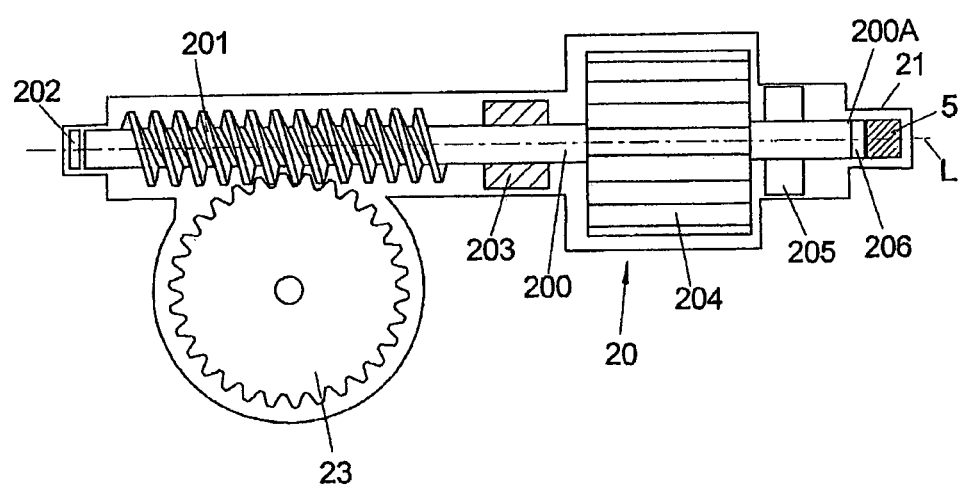
FIG. 2 shows a schematic view of a driving device having a drive shaft supported axially via means of an active bearing element.

FIG. 2 shows a schematic view of a first illustrative embodiment of the driving device 2. The driving device 2 has an electric motor 20 comprising a rotor 204 and a drive shaft 200, which is in engagement with a worm wheel 23 via a worm 201 arranged on the drive shaft 200 and is in operative connection with the cable drum 2 (see FIG. 1) via the worm wheel 23. The drive shaft 200 is supported radially on the housing 21 by a spherical bearing 203 and a "pole pot bearing" 205 and simultaneously supported axially on the housing 21 by means of a thrust element 202, on the one hand, and a thrust element 206 plus an active bearing element 5 in the form of a piezoelectric actuator.

The active bearing element 5 serves for the active support of the drive shaft 200 axially in a longitudinal direction L, in which the drive shaft 200 extends, relative to the housing 21. The active bearing element 5 in the form of the piezoelectric actuator can be energized by applying an electric signal in order to set an axial play of the drive shaft 200 and thus to influence the support of the drive shaft 200 in the longitudinal direction L.

The active support of the drive shaft 200 via the active bearing element 5 can be used to set the axial play in accordance with certain operating states of the driving device 2. Thus, for example, the active bearing element 5 can be used to reduce the axial play in such a way that, when the direction of rotation of the driving device is switched over, as a result of which the loading direction of the forces acting on the drive shaft 200 also changes, there is no troublesome noise, which might otherwise be perceptible as a "changeover click".

Moreover, the axial play can be set in different ways, e.g. in accordance with certain operating conditions, in order to specify a relatively large axial play of the drive shaft 200 in the case of cold starting of the driving device 2, for example, thus avoiding cold startup problems for the driving device 2.

In addition, the active bearing element 5 can also be used to exercise dynamic control over the axial play in such a way that vibrations of the drive shaft 200, especially those acting in an axial direction, are dynamically compensated or at least modified in such a way that there is negligible vibration and noise excitation at the driving device 2, or at least no troublesome vibration and noise excitation.

Moreover, the active bearing element 5 can also be used to achieve a braking effect by braking the drive shaft 200 by applying a contact pressure when trapping of the adjusting device 1 is detected, for example (see FIG. 1). In this way, it is also possible, for example, for the drive shaft 200 and hence the driving device 2 to be fixed in a stationary condition when the driving device 2 is not being energized, ensuring that, when the motor is stationary, there is no unintentional adjustment of an adjustable part to be adjusted (window pane, see FIG. 1) owing to externally acting loading forces or the weight of the adjustable part.

It is advantageous if the active bearing element 5 is configured as a piezoelectric actuator. However, it is also conceivable and possible to embody the active bearing element 5 by means of an electromagnetic actuator or a magnetostrictive actuator. Accordingly, the actuator is driven by an electric signal (piezoelectric actuator), an electromagnetic signal (electromagnetic actuator) or a magnetic signal (magnetostrictive actuator). Common to the actuators is the fact that the applied signal is converted into a mechanical change in the length of the actuator, by means of which the axial play of the drive shaft 200 can be set in a desired manner.

Figure 7:
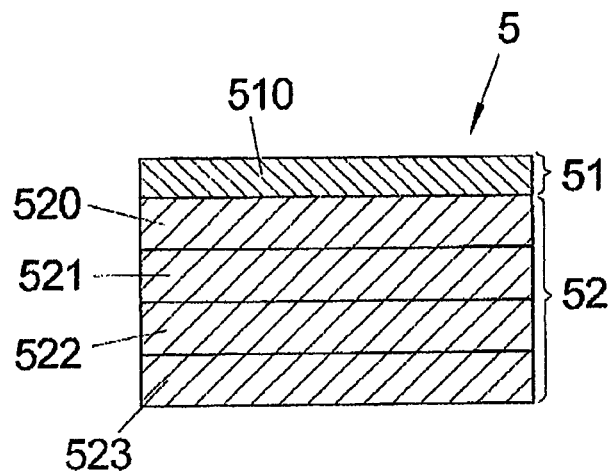
FIG. 7 shows a schematic view of an active bearing element of multilayer construction in the form of a piezoelectric actuator.

As illustrated by way of example in FIG. 7, a bearing element 5 configured as a piezoelectric actuator can be of multilayer construction with a plurality of piezoelectric layers 510, 520, 521, 522, 523. Here, the layers are then connected to one another mechanically, stacked one on top of the other and connected electrically in parallel. In this case, one layer 510 can then embody a piezoelectric sensor, which can sense and detect forces and stresses acting on the active bearing element 5. The other layers 520, 521, 522, 523 embody the piezoelectric actuator and, by virtue of the multilayer construction, enable the axial play to be changed over a relatively large amplitude.

Figure 3:
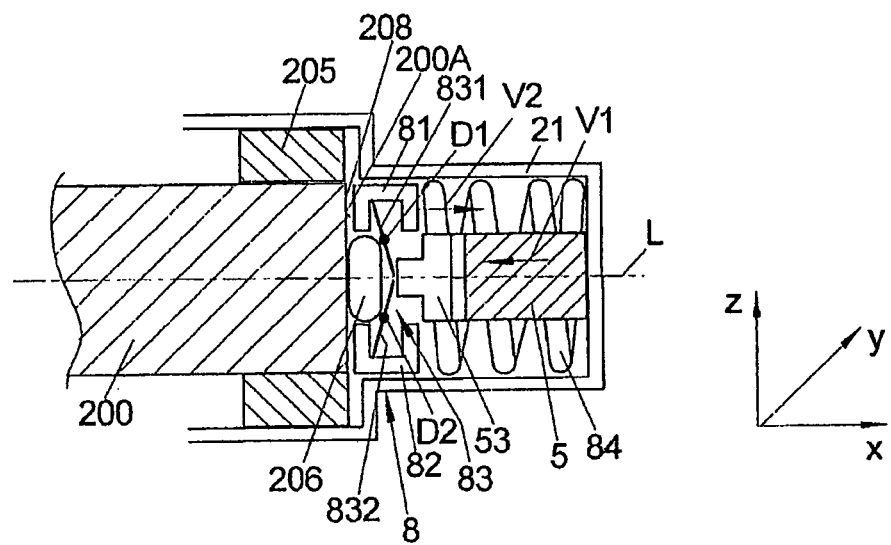
FIG. 3 shows another illustrative embodiment of a drive shaft, which is supported via an active bearing element and is additionally braked by means of a braking device in accordance with the actuation of the active bearing element.

A modified illustrative embodiment of an active bearing of the drive shaft 200 is shown by FIG. 3. In this illustrative embodiment, an active bearing element 5 interacts with a braking device 8 via a thrust element 53, with the active bearing element 5 acting on a lever mechanism 83 and, via the lever mechanism 83, on brake shoes 81, 82.

The brake shoes 81, 82 serve to brake the drive shaft 200 and, for this purpose, rest axially on an axial front end 200A of the drive shaft 200 at a braking surface 208 in a braking position. The brake shoes 81, 82 are preloaded into this braking position relative to the housing 21 by means of a spring 84.

If the active bearing element 5 is not energized, i.e. not actuated, the brake shoes 81, 82 are in their braking position. If, on the other hand, the active bearing element 5 is energized in order to set the axial play of the drive shaft 200, the active bearing element 5 is excited piezoelectrically and expands in the longitudinal direction L, thereby acting on the lever mechanism 83, with the result that the brake shoes 81, 82 are moved out of their braking position and away from the braking surface 208 of the front end 200A of the drive shaft 200 by means of levers 831, 832 mounted so as to be pivotable about pivoting points D1, D2. The drive shaft 200 is thus no longer braked by means of the brake shoes 81, 82 and, at the same time, the axial play of the drive shaft 200 in the longitudinal direction L can be set by means of the active bearing element 5, configured as a piezoelectric actuator for example, by moving the thrust element 53 of the active bearing element 5 closer to the thrust element 206 adjacent to the drive shaft 200, said thrust element 206 being of disk-shaped configuration for example, and, if appropriate, by bringing said thrust element 53 into contact therewith.

Energization changes the length of the active bearing element 5 in direction V1, toward the end 200A of the drive shaft 200. Owing to the lever action of the levers 831, 832 of the lever mechanism 83, the brake shoes 81, 82 are thereby simultaneously moved in the opposite direction V2 and brought out of frictional engagement with the braking surface 208 on the end 200A of the drive shaft 200.

In the illustrative embodiment shown in FIG. 3, in contrast to the illustrative embodiment shown in FIG. 2, braking and locking of the drive shaft 200 is accomplished in a manner controlled indirectly via the active bearing element 5. The active bearing element 5 is energized to release the braking device 8 and can then be used for quasi-static or dynamic setting of the axial play of the drive shaft 200 in the energized state. If the energization of the active bearing element 5 is canceled again, the brake shoes 81, 82 return to their braking position by virtue of their preloading by the spring 84, ensuring that the drive shaft 200 is braked again and fixed in a stationary condition of the driving device 2.

Figure 4:
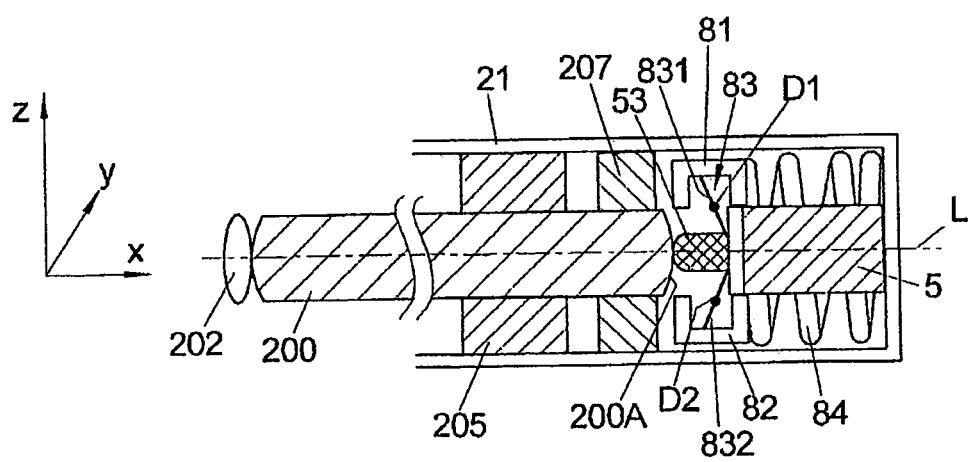
FIG. 4 shows a view of another illustrative embodiment of an actively supported drive shaft.

An illustrative embodiment which is only slightly modified compared with the illustrative embodiment shown in FIG. 3 is shown by FIG. 4. In this illustrative embodiment, the brake shoes 81, 82 of the braking device 8 do not act on a friction surface on a front end of the drive shaft 200 but on an annular brake disk 207, which is mounted on the axial end 200A of the drive shaft 200. Otherwise, the mode of operation of the illustrative embodiment shown in FIG. 4 is analogous to that described above by means of the illustrative embodiment shown in FIG. 3.

The illustrative embodiment shown in FIG. 5 is once again only slightly modified compared with the illustrative embodiment shown in FIG. 4. In this illustrative embodiment, the thrust element 53 on the same side as the active bearing element 5 extends into the active bearing element 5 in the longitudinal direction L and is itself configured as an active bearing element. Here, the (active) thrust element 53 is used to set the axial play of the drive shaft 200. The active bearing element 5, in contrast, serves exclusively for actuation of the braking device 8.

Figure 5:
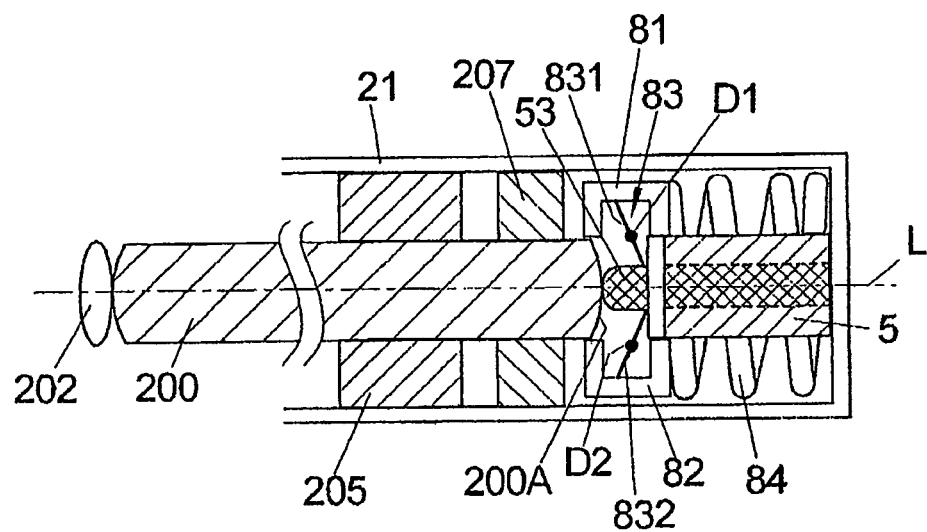
FIG. 5 shows a view of an illustrative embodiment modified as compared with the illustrative embodiment shown in FIG. 4.
Figure 6:
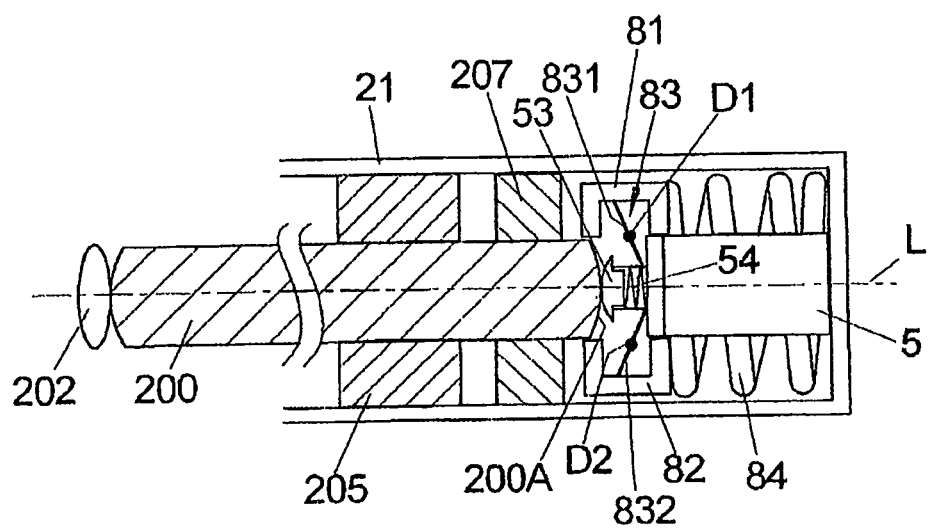
FIG. 6 shows a view of another illustrative embodiment of an actively supported drive shaft.

FIG. 6 shows an illustrative embodiment which differs from the illustrative embodiments shown in FIGS. 4 and 5 in that the thrust element 53 is preloaded in a resilient manner relative to the active bearing element 5 by an additional spring 54. This has the effect that the axial play of the drive shaft 200 is not determined exclusively by means of the active bearing element 5 but is the product of the setting of the active bearing element 5, on the one hand, and of the spring characteristic of the spring 54, on the other hand.

However, by appropriate energization of the active bearing element 5 and configuration of the spring characteristic, it is possible in this case too to bring the thrust element 53 into contact with the end 200A of the drive shaft 200 in such a way that elasticity in the axial play is excluded and the axial play of the drive shaft 200 is thus very largely minimized.

In other respects, the mode of operation is analogous to that described above by means of FIGS. 3 to 5 in the case of this illustrative embodiment too.

Figure 8:
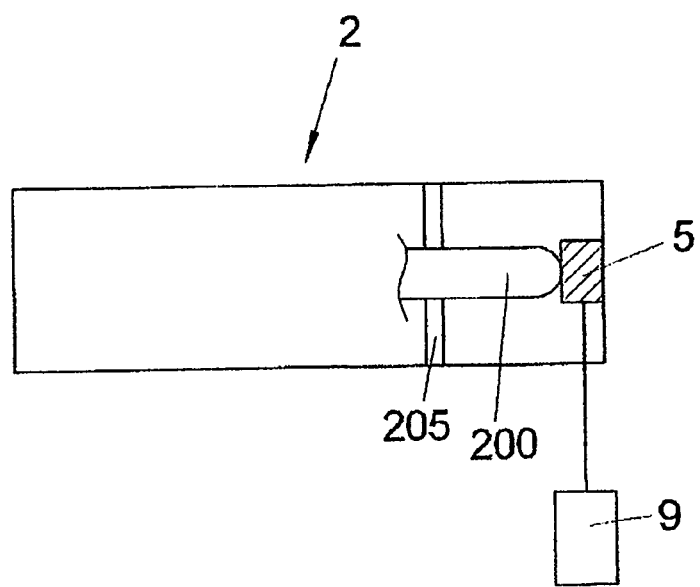
FIG. 8 shows a schematic view of a driving device controlled by means of control electronics and having active bearing elements.

As illustrated schematically in FIG. 8, control electronics 9 can be provided in order to exercise open-loop and closed-loop control over the active bearing element 5 of the driving device 2. In this case, the control electronics 9 can be integrated into the electronics of the driving device 2. However, it is also conceivable to configure the control electronics 9 as part of a door control unit separately from the driving device 2.

The control electronics 9 are connected electrically to the active bearing element 5, which is designed as a piezoelectric actuator, and serves for energization of said active bearing element 5. In this case, the control electronics 9 can specify an axial play and set it in a quasi-static manner, in an event-dependent manner for example, with reference to external inputs and manipulated variables, e.g. the temperature in or outside the vehicle or the operating temperature of the electric motor 20. If, for example, an instance of trapping is detected at an adjusting device associated with the driving device 2, the active bearing element 5 can be activated in such a way that the driving device 2 is braked and fixed (as described above by means of the illustrative embodiments shown in FIGS. 2 to 6).

If an unbalance of components, in particular of the drive shaft 200 and of the rotor 204, is detected during the operation of the driving device 2, it is also possible for the active bearing element 5 to be activated dynamically in such a way that vibrational excitation of the driving device 2 is where possible at least damped to minimize noise and minimize the excitation of components coupled to the driving device 2. Thus, for example, it is possible to use the active bearing element 5 to produce a compensation signal which is precisely in phase opposition to the excited vibrations at the drive shaft 200 and in this way counteracts vibrations excited at the drive shaft 200.

Overall, it is possible to achieve an improvement in the acoustics of a driving device through active support by means of active bearing elements of the type described. This is achieved inter alia by virtue of the fact that locking of the driving device can be provided by means of the active bearing elements, making a self-locking configuration of the mechanical components of the driving device unnecessary and hence enabling improved design of the driving device from an acoustic standpoint.

Moreover, the active support may result in an improvement in the anti-trap function since the driving device can be braked under closed-loop control when trapping is detected.

It is also possible to make the driving device overall smaller and lighter because it is possible to use a transmission of increased efficiency, which does not have to be of self-locking configuration. In particular, it may be possible to dispense with an additional braking device, e.g. a wrap spring.

Finally, an improvement in the detection of an adjustment position of an adjustable part may be obtained by detecting a motor current signal because, by virtue of the active support, the drive shaft can be fixed when the driving device is stationary, and hence the drive shaft cannot adopt random positions (relative to the last energized position—detected from ripples in the motor current for example—before the motor was switched off).

Figure 9B:
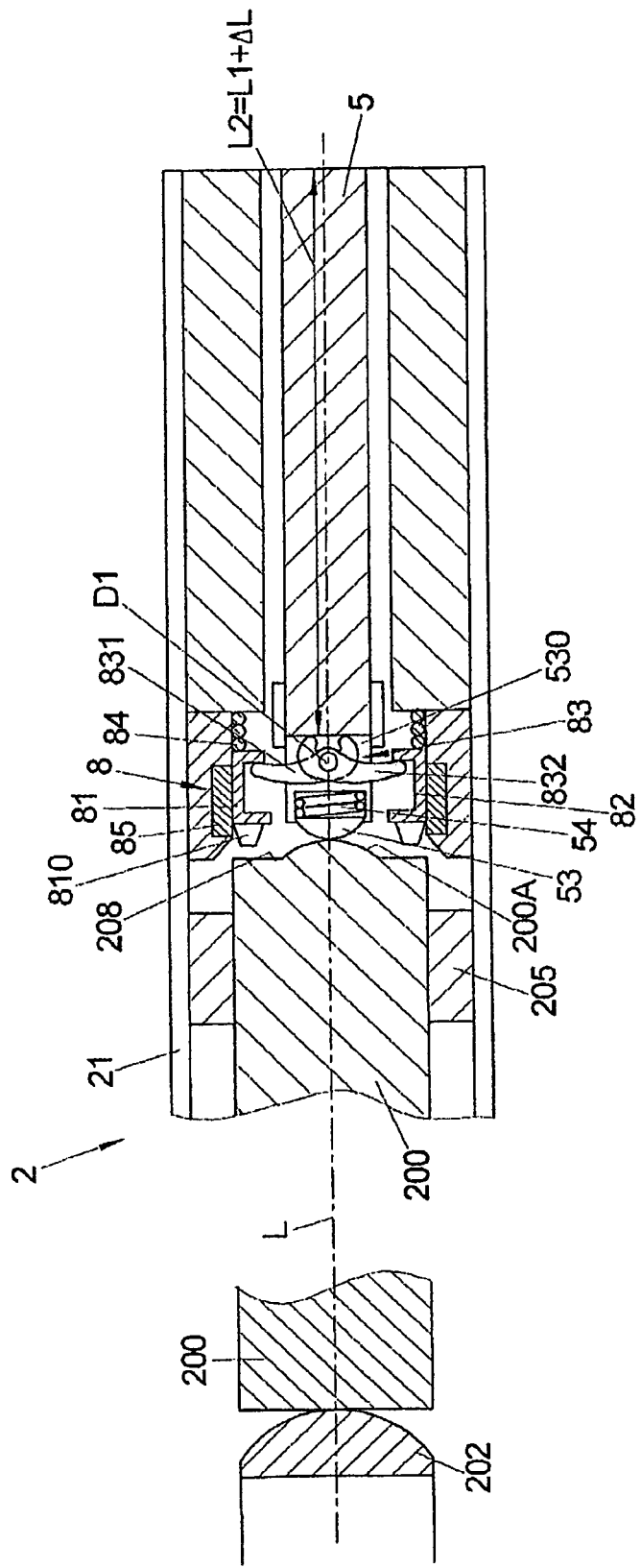
FIG. 9B shows a schematic view of the driving device shown in FIG. 9A, in an energized state of the active bearing element.

FIGS. 9A and 9B show another illustrative embodiment of a driving device 2 having a drive shaft 200 which is actively supported by means of an active bearing element 5 in the form of a piezoelectric element.

In this case, the active bearing element 5 serves, on the one hand, to set an axial play of the drive shaft 200 during normal operation of the driving device 2 by means of a thrust element 53, which is guided by means of a spring 54 on a guide element 530 connected securely to the active bearing element 5, and it is therefore possible to achieve advantageous operating behavior.

In this way, the axial play can be used statically or quasi-statically to set a fixed play, for example. However, it is also possible to vary the axial play dynamically during the operation of the driving device 2, thus making it possible to compensate dynamically for unbalances or, alternatively, to modify noise excitation, ensuring that noise excitation is minimized, for example, in predetermined frequency ranges.

On the other hand, the active bearing element serves indirectly to actuate a braking device 8. The braking device 8 has brake shoes 81, 82, which can be embodied as an integral braking element in the form of a brake ring and which, in a braking state, rest via a friction element 810 on an axial friction surface 208 of the drive shaft 200, as illustrated in FIG. 9A. The brake shoes 81, 82 are supported against twisting relative to a housing 21 by a radial support 85 and are preloaded relative to the housing 21 in an axial direction on the longitudinal axis L by a spring 84.

The braking device 8 is used to exert a braking action in the axial direction on the drive shaft 200 in an operating state in which locking of the driving device 2 is desired, thus ensuring that the drive shaft 200 is locked and cannot readily rotate about the longitudinal axis L. In this way the drive shaft 200 can be fixed by means of the braking device 8, thus blocking forces applied to the output side of the driving device 2 or rendering further movement of the drive shaft 200 impossible if trapping is detected.

The braking device 8 is actuated via the active bearing element 5. For this purpose, the brake shoes 81, 82 of the braking device 8 are coupled to the active bearing element 5 by a lever mechanism 83. The lever mechanism 83 has levers 831, 832, which are mounted on the housing 21 so as to be pivotable about an axis D1 of rotation and rest with a short end on the active bearing element 5 and with a long end on the brake shoes 81, 82.

The lever mechanism 83 embodies a step up mechanism, which is designed to convert a small adjustment travel of the active bearing element 5 into a relatively large adjustment travel of the brake shoes 81, 82. The transmission ratio can be 1:15, for example, with the result, for example, that an adjustment travel of the active bearing element 5 by 50 μm is converted into an actuating travel of the brake shoes 81, 82 of 750 μm.

In interaction with the braking device 8, the active bearing element 5 serves to provide locking of the driving device 2 in an unenergized state of the driving device 2, i.e. when the motor is stationary, whereas, in an energized state of the motor, i.e. during normal operation of the driving device 2, it serves to release the drive shaft 200 in order to allow smooth movement of the drive shaft 200. In this way, locking is selectable and, in addition, the axial play of the drive shaft 200 is set in a desired manner by means of the active bearing element 5 during normal operation of the driving device 2.

In the unenergized state of the motor, illustrated in FIG. 9A, the active bearing element 5 is not supplied with an electric voltage. In this state, the brake shoes 81, 82 make frictional contact with the friction surface 208 of the drive shaft 200 via the friction element 810 owing to the preloading by the spring 84, thus ensuring that the drive shaft 200 is fixed by virtue of non-positive locking with the brake shoes 81, and cannot be rotated. In this state, the active bearing element 5 has a length L1 and does not have a resetting effect on the brake shoes 81, 82.

If the driving device 2 is to be actuated in order to adjust an adjustable part, the driving device 2 is energized, and a voltage is also applied to the active bearing element 5, leading to a lengthening of the active bearing element 5, as illustrated in FIG. 9B. When a corresponding voltage is applied, the active bearing element 5 lengthens in the axial direction along the longitudinal axis L by a change in length ΔL relative to the state shown in FIG. 9A, with the result that it has a length L2=L1+ΔL. Owing to the change in length ΔL, the active bearing element 5 acts via the levers 831, 832 of the lever mechanism 83 on the brake shoes 81, 82 and pulls them away from the drive shaft 200, with the result that the friction element 810 is no longer in non-positive contact with the friction surface 208 of the drive shaft 200 (the non-positive locking is canceled; on the other hand, there can still be slight frictional contact between the friction element 810 and the friction surface 208).

Through activation of the active bearing element 5, the braking device 8 is thus actuated to release the drive shaft 200. At the same time, the thrust element 53 is brought into contact with the drive shaft 200 or the contact of the thrust element 53 with the end 200A of the drive shaft 200 is intensified, thus enabling the axial play of the drive shaft 200 to be set in a desired manner by means of the active bearing element 5 via the thrust element 53.

Switchable locking of the driving device 2 by means of the active bearing element 5 is thus provided. This makes it possible not to configure the driving device 2 as a self-locking device and also not to provide a passive braking device, e.g. in the form of a wrap spring brake, thus allowing frictional losses of the driving device 2 during operation to be reduced and increasing the efficiency of the driving device 2 overall.

At the same time, advantageous operating behavior of the driving device 2 during adjustment of an adjustable part can be achieved by setting the axial play by means of the active bearing element 5. In particular, noise can be reduced, a changeover click avoided, and noise excitation in certain frequency ranges can be suppressed.

Figure 10:
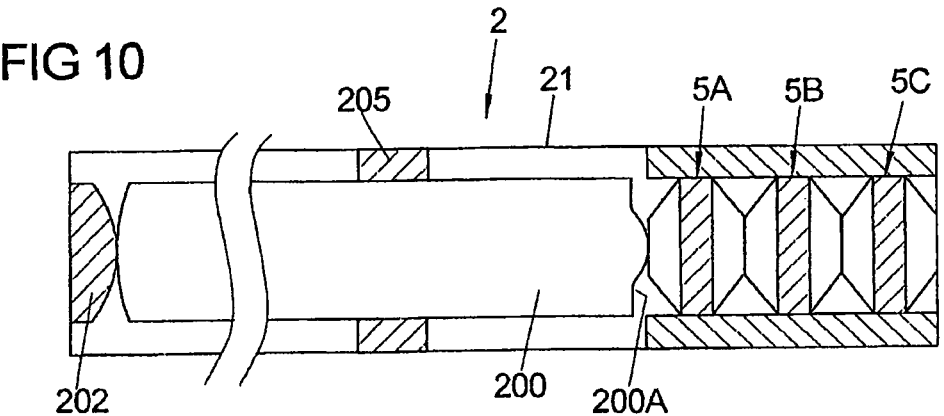
FIG. 10 shows a schematic view of another illustrative embodiment of an actively supported drive shaft.

FIG. 10 shows another illustrative embodiment of a driving device 2 having an actively supported drive shaft 200. In this illustrative embodiment, a plurality of active bearing elements 5A, 5B, 5C is arranged axially in series between the end 200A of the drive shaft 200 and the housing 21, and therefore the effect of the active bearing elements 5A, 5B, 5C is cumulative.

It is advantageous if the active bearing elements 5, 5A, 5B, 5C are designed as a piezoelectric elements, of which illustrative embodiments are shown in FIGS. 11A to 11G.

Figure 11A:
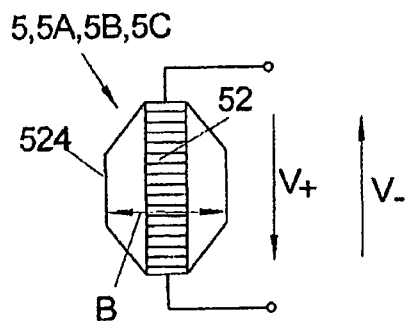
FIGS. 11A-11G show schematic views of different piezoelectric active bearing elements.

As illustrated in FIG. 11A, the active bearing element 5, 5A, 5B, 5C can, for example, have an actuator section 52 consisting of individual piezoelectric layers, to which a positive voltage V+ or a negative voltage V− can be applied in order to shorten or lengthen the actuator section 52 in the direction of the applied voltage. Spring sections 524 are attached laterally to the actuator section 52, said spring sections projecting laterally from the actuator section 52 and giving the active bearing element 5, 5A, 5B, 5C a width B.

If a positive voltage V+ is applied to the actuator section 52, for example, the actuator section 52 can increase in length, with the result that the width B decreases due to the effect on the spring section 524. Conversely, if a negative voltage V− is applied to the actuator section 52, the width B increases owing to shortening of the actuator section 52.

Figure 11B:
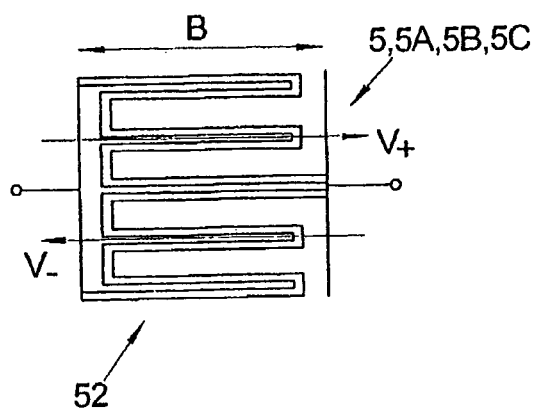

Another illustrative embodiment of an active bearing element 5, 5A, 5B, 5C in the form of a piezoelectric element is illustrated in FIG. 11B. In this illustrative embodiment, an actuator section 52 consisting of a piezoelectric element is provided, extending in a meandering shape and thus providing a piezoelectric section of great length. Because the lengthening of a piezoelectric element when a voltage is applied is proportional to the length of the piezoelectric element, it is possible in this way to achieve an increase or reduction in the width B of the active bearing element 5, 5A, 5B, 5C when a positive voltage V+ or a negative voltage V− is applied between the ends of the actuator section 52.

Figure 11C:
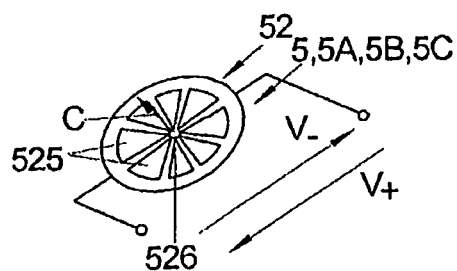

Another illustrative embodiment of an active bearing element 5, 5A, 5B, 5C is illustrated in FIG. 11C. The active bearing element 5, 5A, 5B, 5C has a dish-shaped actuator section 52 on which an active section 526 is arranged by means of spring webs 525. By applying a voltage to the actuator section 52, the active section 526 can be moved by means of the spring webs 525 in a direction C or counter to the direction C relative to the actuator section 52.

Figure 11D:
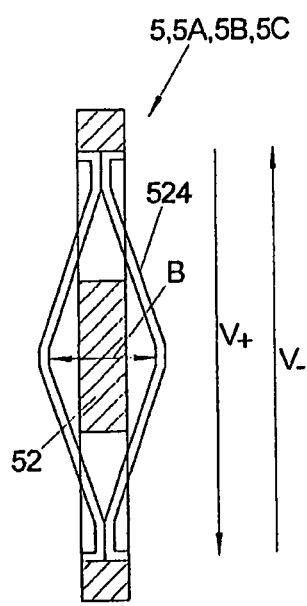
Figure 11E:
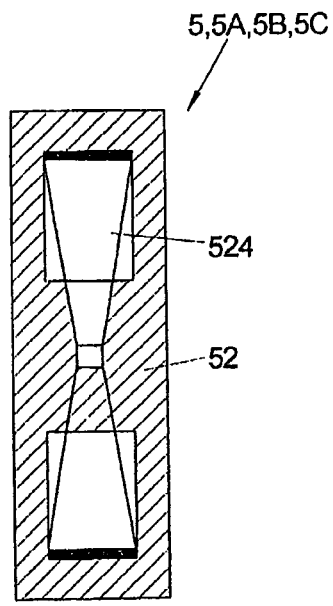

In an illustrative embodiment of a piezoelectric active bearing element 5, 5A, 5B, 5C which is illustrated in FIGS. 11D and 11E, a spring section 524 is arranged on an actuator section 52 shaped in the manner of an "8", wherein the spring section projects on both sides from the actuator section 52 (see FIG. 11D) and is secured in apertures of the 8-shaped actuator section 52. By applying a voltage V+, V−, it is possible to lengthen or shorten the actuator section 52, making it possible in this way to reduce or increase the width B of the active bearing element 5, 5A, 5B, 5C.

Figure 11F:
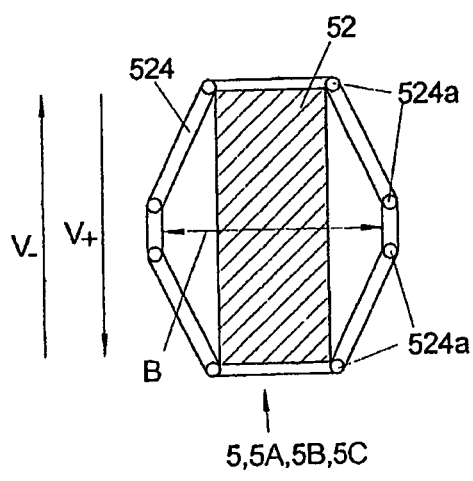

In an illustrative embodiment shown in FIG. 11F, which is similar to the illustrative embodiment shown in FIG. 11A, spring sections 524 are of rigid design in sections, wherein the rigid sections are connected to one another by joints 524a. By applying a voltage V+, V− to the actuator section 52, it is once again possible to alter the width B of the active bearing element 5, 5A, 5B, 5C.

Figure 11G:
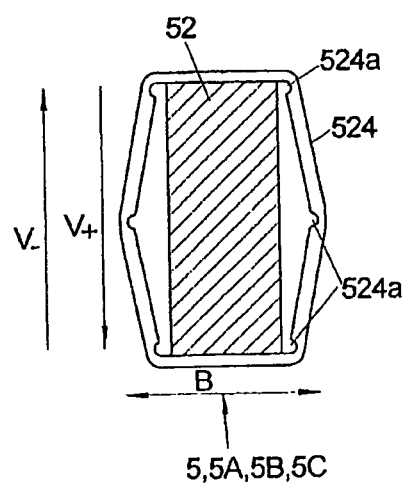

In a slightly modified further illustrative embodiment shown in FIG. 11G, the spring section 524 is of integral design and surrounds the actuator section 52, wherein sections of the spring section 524 are connected to one another by joints 524a in the form of film hinges. Once again, the width B of the active bearing element 5, 5A, 5B, 5C can be altered by applying a voltage V+, V−.

Piezoelectric actuator systems are also described, for example, in the dissertation by Muhammed Abed Al-Wahab, "Neue Aktorsysteme auf Basis strukturierter Piezokeramik" [Novel Actuator Systems Based on Structured Piezoelectric Ceramics], Universität Magdeburg, 2004.

The illustrative embodiments described of active bearing elements 5, 5A, 5B, 5C in the form of piezoelectric elements are to be taken as purely illustrative. Here, the illustrative embodiments shown in FIGS. 11A, 11B, 11C bring about an amplification of the actuating travel such that a relatively small lengthening or shortening of the actuator section 52 is converted into a relatively large increase or reduction in the width B of the active bearing element 5, 5A, 5B, 5C.

By means of the active bearing elements 5A-5C in the illustrative embodiment shown in FIG. 10, the axial play can be set in a static (quasi-static) or dynamic manner. Here, the active bearing elements 5A-5C can be of a kind such that the drive shaft 200 is subject to a defined preload in the axial direction when no voltage is being applied to the bearing elements 5A-5C of piezoelectric design. If a positive voltage is applied to the piezoelectric bearing elements 5A-5C, the preload can be reduced or even completely eliminated. If a negative voltage is applied to the active bearing elements 5A-5C, the preload can be increased.

The number of bearing elements 5A-5C of piezoelectric design can be chosen according to requirements and according to the desired amplitude of the change in length.

In the region of the housing 21 in which the piezoelectric active bearing elements 5A-5C are arranged (on the right of the drive shaft 200 in FIG. 10, in accordance with the section of the housing 21), the housing 21 can be designed to have at least a slight elasticity in the radial direction. This makes it possible to compensate for a change in the length of the piezoelectric active bearing elements 5A-5C without the active bearing elements 5A-5C jamming in the housing 21.

Another illustrative embodiment of an actively supported drive shaft 200 is shown by FIG. 12. This is modified as compared with the illustrative embodiment shown in FIG. 10 in that a further active bearing element 5D is provided, which is mounted on the housing 21 in such a way that it can be moved axially along the longitudinal axis L and via which the active bearing elements 5A-5C act on the drive shaft 200.

The active bearing elements 5A-5D can perform different functions. For example, active bearing elements 5A-5C can serve to set the axial play of the drive shaft 200 in a static or quasi-static manner and thus to specify a defined preload on the drive shaft 200 in the axial direction. Active bearing element 5D, in contrast, can serve to vary the axial play of the drive shaft 200 in a dynamic manner during the operation of the driving device 2 and in accordance with a dynamic load on the drive shaft 200, for example, thus enabling noise to be attenuated, an unbalance to be compensated and the overall operating behavior to be influenced.

The active bearing elements 5A-5D can be of different structural designs, allowing different active bearing elements 5A-5D to be combined.

In another illustrative embodiment, which is shown in FIG. 13, a drive shaft 200 is actively supported by means of active bearing elements 5A-5C, which are in operative connection with the end 200A of the drive shaft 200 via a coupling element 55. In addition, a braking device 8 is provided which, in a manner analogous to that described above, has brake shoes 81, guided on the housing 21 by means of a radial support 85 and has a lever mechanism 83.

For actuation of the braking device 8, an additional active bearing element 5D is provided, said bearing element being designed as an annular sleeve and enclosing the other active bearing elements 5A-5C, the latter bearing elements thus being arranged in an internal cavity of the additional bearing element 5D. The additional active bearing element 5D acts on the levers 831, 832 of the lever mechanism 83 and pivots them about their associated pivoting axes D1, D2 in order in this way to act on the brake shoes 81, 82 so as to release the drive shaft 200.

Figure 14:
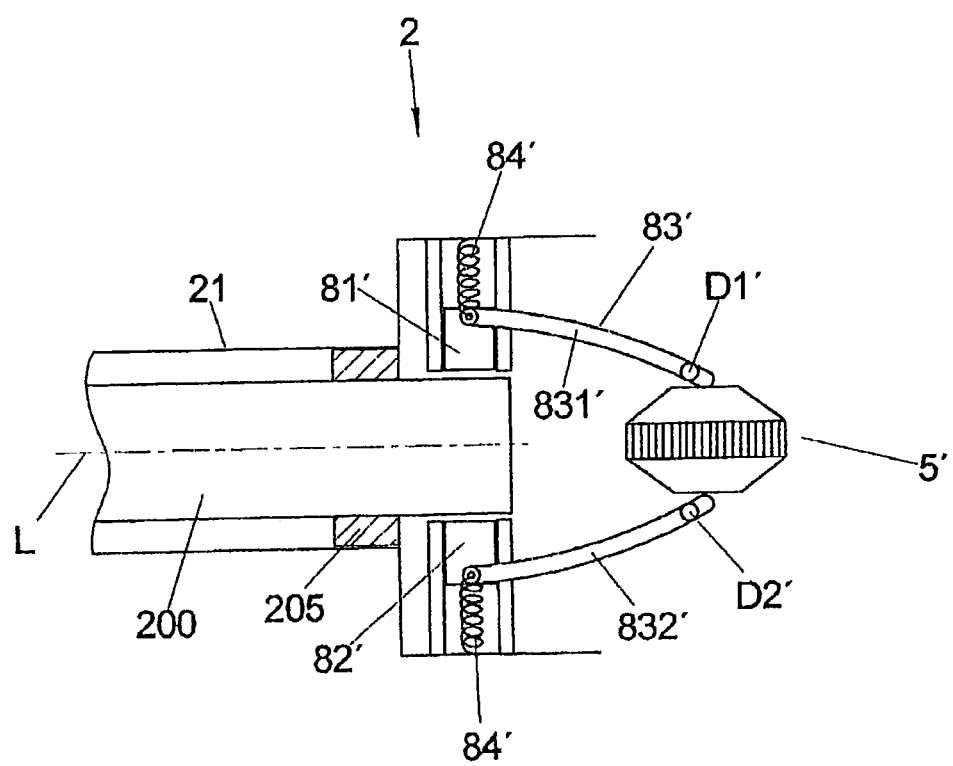
FIG. 14 shows a view of a braking device acting radially on a drive shaft.

FIG. 14 shows an illustrative embodiment of a driving device 2 in which a drive shaft 200 can be fixed by way of a braking device by means of brake shoes 81', 82' acting radially on the drive shaft 200. The brake shoes 81', 82' are preloaded in the radial direction relative to the housing 21 by means of springs 84' and are in operative connection via levers 831', 832' of a lever mechanism 83' with an active bearing element 5' in the form of a piezoelectric element.

In an unenergized state of the active bearing element 5, the brake shoes 81', 82' are in frictional contact with an outer circumferential surface of the drive shaft 200, thus establishing non-positive locking between the brake shoes 81', 82' guided radially on the housing 21 and the drive shaft 200 and ensuring in this way that the drive shaft 200 is fixed.

If the active bearing element 5' of piezoelectric design is actuated by applying a voltage, the active bearing element 5' acts via the levers 831', 832' on the brake shoes 81', 82' and adjusts them radially outward, thus canceling the non-positive locking between the brake shoes 81', 82' and the drive shaft 200 and thus releasing the drive shaft 200 for smooth operation.

The levers 831', 832' are mounted on the housing 21 in such a way as to be pivotable about associated pivoting axes D1', D2' and are connected by means of their short ends to the active bearing element 5' in such a way that the brake shoes 81', 82' can be pulled radially away from the drive shaft 200 by reducing the width of the active bearing element 5' (transversely to the longitudinal direction L).

The concept underlying the invention is not restricted to the illustrative embodiments described above but can also be implemented in embodiments of a fundamentally different kind. Thus, a driving device of the type described here is, in particular, not restricted to use with window lifters on motor vehicle doors but can be employed in any other adjusting devices in a vehicle.

The invention claimed is:

1. A driving device for an adjusting device of a motor vehicle, the driving device comprising:
    a housing or housing section which at least partially encloses components of the driving device; and
    an electric motor-driven drive shaft which extends in a longitudinal direction,
    wherein an active bearing element is arranged between the housing or housing section and the drive shaft at at least one end of the drive shaft, said bearing element being suitable for acting on the drive shaft axially in the longitudinal direction during the operation of the driving device, and
    wherein the active bearing element is designed to bring about locking of a rotary motion of the drive shaft in accordance with an actuation.

2. The driving device as claimed in claim 1, wherein, when viewed in the longitudinal direction, the active bearing element is arranged axially between the housing or housing section and the associated end of the drive shaft.

3. The driving device as claimed claim 1, further comprising a braking device, which interacts with the active bearing element and is designed to lock a rotary motion of the drive shaft by interacting with the active bearing element.

4. The driving device as claimed in claim 3, wherein the braking device is coupled to the active bearing element by a lever mechanism.

5. The driving device as claimed in claim 4, wherein the lever mechanism is configured as a step up mechanism in such a way that a small actuating travel of the active bearing element is converted into a larger actuating travel of the braking device.

6. The driving device as claimed in claim 4, wherein the braking device has at least one brake shoe for braking the drive shaft.

7. The driving device as claimed in claim 6, wherein the at least one brake shoe is preloaded relative to the housing or housing section of the driving device in the direction of a braking position, in which the at least one brake shoe rests with a braking action on the drive shaft or on a brake disk arranged on the drive shaft, and the active bearing element is coupled to the at least one brake shoe in order to release the at least one brake shoe from the braking position.

8. The driving device as claimed in claim 1, wherein the active bearing element is axially in contact with the associated end of the drive shaft via a thrust element for setting the axial play of the drive shaft.

9. The driving device as claimed in claim 8, wherein the thrust element is arranged on the active bearing element and is connected to the bearing element.

10. The driving device as claimed in claim 8, wherein the thrust element is preloaded axially by a spring relative to the active bearing element so as to rest against the associated end of the drive shaft.

11. The driving device as claimed in claim 1, wherein the active bearing element constructed as a piezoelectric actuator is of multilayer construction with a plurality of piezoelectric layers.

12. The driving device as claimed in claim 11, wherein one of the piezoelectric layers embodies a sensor section for detecting axial forces acting on the active bearing element via the drive shaft.

13. The driving device as claimed in claim 1, wherein the active bearing element is connected to control electronics.

14. The driving device as claimed in claim 13, wherein the control electronics are configured for producing a dynamic compensation signal in accordance with vibrations detected at the drive shaft.

15. A driving device for an adjusting device of a motor vehicle, the driving device comprising:
    a housing or housing section which at least partially encloses components of the driving device; and
    an electric motor-driven drive shaft which extends in a longitudinal direction,
    wherein an active bearing element is arranged between the housing or housing section and the drive shaft at at least one end of the drive shaft, said bearing element being suitable for acting on the drive shaft axially in the longitudinal direction during the operation of the driving device,
    wherein the active bearing element can be actuated in order to set an axial play of the drive shaft relative to the housing or housing section or in order to influence the vibrational behavior of the drive shaft and is designed to act axially in the longitudinal direction on the drive shaft.

16. The driving device as claimed in claim 15, wherein, when viewed in the longitudinal direction, the active bearing element is arranged axially between the housing or housing section and the associated end of the drive shaft.

17. The driving device as claimed claim 15, further comprising a braking device, which interacts with the active bearing element and is designed to lock a rotary motion of the drive shaft by interacting with the active bearing element.

18. The driving device as claimed in claim 17, wherein the braking device is coupled to the active bearing element by a lever mechanism.

19. The driving device as claimed in claim 18, wherein the lever mechanism is configured as a step up mechanism in such a way that a small actuating travel of the active bearing element is converted into a larger actuating travel of the braking device.

20. The driving device as claimed in claim 18, wherein the braking device has at least one brake shoe for braking the drive shaft.

21. The driving device as claimed in claim 20, wherein the at least one brake shoe is preloaded relative to the housing or housing section of the driving device in the direction of a braking position, in which the at least one brake shoe rests with a braking action on the drive shaft or on a brake disk arranged on the drive shaft, and the active bearing element is coupled to the at least one brake shoe in order to release the at least one brake shoe from the braking position.

22. The driving device as claimed in claim 15, wherein the active bearing element is axially in contact with the associated end of the drive shaft via a thrust element for setting the axial play of the drive shaft.

23. The driving device as claimed in claim 22, wherein the thrust element is arranged on the active bearing element and is connected to the bearing element.

24. The driving device as claimed in claim 22, wherein the thrust element is preloaded axially by a spring relative to the active bearing element so as to rest against the associated end of the drive shaft.

25. The driving device as claimed in claim 15, wherein the active bearing element constructed as a piezoelectric actuator is of multilayer construction with a plurality of piezoelectric layers.

26. The driving device as claimed in claim 25, wherein one of the piezoelectric layers embodies a sensor section for detecting axial forces acting on the active bearing element via the drive shaft.

27. The driving device as claimed in claim 15, wherein the active bearing element is connected to control electronics.

28. The driving device as claimed in claim 27, wherein the control electronics are configured for producing a dynamic compensation signal in accordance with vibrations detected at the drive shaft.

29. A driving device for an adjusting device of a motor vehicle, the driving device comprising:
    a housing or housing section which at least partially encloses components of the driving device; and
    an electric motor-driven drive shaft which extends in a longitudinal direction,
    wherein an active bearing element is arranged between the housing or housing section and the drive shaft at at least one end of the drive shaft, said bearing element being suitable for acting on the drive shaft axially in the longitudinal direction during the operation of the driving device, and
    wherein the active bearing element constructed as a piezoelectric actuator serves as a sensor for detecting vibrations and as an actuator for producing the compensation signal, wherein the active bearing element can be operated simultaneously or alternately as a sensor for detecting vibrations and as an actuator for producing the compensation signal.

30. A method for operating a driving device for an adjusting device of a motor vehicle, wherein the driving device comprises:
    a housing or housing section which at least partially encloses components of the driving device; and
    an electric motor-driven shaft which extends in a longitudinal direction and which is axially supported on the housing or housing section at least via one end,
    wherein an active bearing element is arranged between the housing or housing section and the drive shaft at at least one end of the drive shaft, and
    the method comprising actuating said bearing element during the operation of the driving device in order to act on the drive shaft axially in the longitudinal direction,
    wherein, in a first operating state of the driving device, the active bearing element brings about locking of a rotary motion of the drive shaft and, in a second operating state of the driving device, is actuated in order to set an axial play of the drive shaft relative to the housing or housing section or in order to influence the vibrational behavior of the drive shaft and, for this purpose, acts axially in the longitudinal direction on the drive shaft.

31. The method as claimed in claim 30, wherein the axial play is set by means of the active bearing element in accordance with an operating state of the driving device, in particular the operating temperature of the driving device or fixed vibration parameters.

* * * * *